even though the invention may be applied to sulfuric

United States Patent Office 2,981,767
Patented Apr. 25, 1961

2,981,767
ISO-OLEFIN PURIFICATION

Richard J. Gay and Calvin M. Tidwell, Houston, Tex., assignors to Petro-Tex Chemical Corporation, Houston, Tex., a corporation of Texas No Drawing. Filed Sept. 29, 1958, Ser. No. 763,839

8 Claims. (Cl. 260—677)

This invention relates to production of iso-olefins and relates more particularly to an improved process for providing isobutylene and isopentylene having purities greater than about 99 percent.

Isobutylene is normally separated and segregated from $C_4$ hydrocarbon fractions, obtained as petroleum process by-products and the like, by treating a $C_4$ hydrocarbon stream containing isobutylene with polybasic mineral acids, particularly sulfuric acid in the range of about 55 to 70 weight percent. When the $C_4$ hydrocarbon stream containing isobutylene is passed into the concentrated sulfuric acid, the isobutylene is selectively absorbed by the sulfuric acid. At the same time, small amounts of other $C_4$ hydrocarbons such as isobutane, butenes, n-butane and the like are also absorbed in the acid. Normally, the sulfuric acid containing dissolved or entrained therein a portion of the $C_4$ hydrocarbon stream as described, is first weathered and then heated to release a substantial proportion of the absorbed isobutylene. Under the process conditions as described, the purity of the isobuylene so produced normally contains from about 90 to about 95 percent isobutylene with isobutane and butene-1 as the major impurities.

Isobutylene of a purity greater than about 99 percent is desired in making industrial chemical derivatives and polymers therefrom. As seen from the above described process, isobutylene of the desired purity is not readily obtained. A number of procedures have been proposed to increase the purity of isobutylene produced substantially as described. These methods include vacuum stripping of the sulfuric acid extract, passing gases through the sulfuric acid extract in an attempt to physically blow out the undesirable impurities, fractional distillation of the isobutylene product liberated from the sulfuric acid and the like.

We have now found that isobutylene with a purity greater than 99 percent and only traces of butene-1 can be readily and inexpensively produced by means of the improvement which comprises washing the sulfuric acid extract containing isobutylene dissolved therein with certain liquid unsaturated polyolefin polymers such as the polymers of isobutylene prior to regenerating the isobutylene. Liquid isobutylene polymers are readily obtained by heating a sulfuric acid extract containing isobutylene dissolved therein. The liquid polymers of isobutylene so produced are mainly diisobutylene and triisobutylene. These poly-isobutylenes are normally formed when isobutylene is liberated from the isobutylene-containing sulfuric acid extract by heating. An obvious advantage of this invention is when diisobutylene and triisobutylene are obtained as by-products during the regeneration of isobutylene from sulfuric acid by heating, as a result of polymerization of isobutylene, they may be recycled to aid in increasing the purity of the isobutylene in accordance with this invention. The substantial removal of butene-1 as an impurity from isobutylene is quite advantageous since butene-1 boils so closely to isobutylene that they cannot be separated by distillation and when the isobutylene is to be employed in Friedel-Crafts polymerizations to produce rubbery polymers of isobutylene, butene-1 is an undesirable impurity.

In practice of this invention a fractionated by-product refinery stream containing $C_4$ hydrocarbons such as n-butane, isobutane, butene-1, butene-2 and isobutylene is mixed with sulfuric acid of about 55 to 70 weight percent at temperatures in the range of about 60° F. to 125° F. under pressures of about 50 to 150 p.s.i.g. The unabsorbed gases are passed out of the reaction zone and the sulfuric acid extract containing essentially isobutylene along with small amounts of other $C_4$ hydrocarbons dissolved or entrained therein, usually 5 to 10 percent, is weathered. The sulfuric acid extract is then contacted with diisobutylene and/or triisobutylene in a ratio of about one-half or more volumes of diisobutylene or triisobutylene to 10 volumes of the isobutylene-containing sulfuric acid extract to wash out or extract the undesirable $C_4$ hydrocarbons such as isobutane and butenes from the isobutylene-containing sulfuric acid extract. After thorough mixing, as by counter-current flow, the sulfuric acid extract and liquid polyisobutylene are separated by settling and the polyisobutylene used as the extractant, and containing isobutane, butenes and n-butane dissolved therein, is passed to a storage tank and the extracted isobutylene-containing sulfuric acid extract is passed to a reaction zone where it is heated or otherwise treated to free the isobutylene. By following this procedure, isobutylene is obtained which has a purity greater than 99 percent isobutylene with only trace amounts of isobutane, butene-1 and n-butane present as impurities. Isobutylene product obtained as described but in which the isobutylene-containing sulfuric acid was not washed with liquid polyisobutylene normally has a purity of only 90 to 95 percent.

The amount of isobutylene absorbed in sulfuric acid will vary, depending upon reaction conditions, as will be recognized by those skilled in the art. In applying the novel improvement of this invention to the isobutylene purification process it has been found that better results are ordinarily obtained when sulfuric acid of a concentration of about 62 to 66 percent acid and having a specific gravity of about 1.50 to about 1.58 contains dissolved therein enough $C_4$ hydrocarbon, which is substantially isobutylene, so that the isobutylene-containing sulfuric acid extract has a specific gravity of about 1.15 to about 1.25. When the isobutylene-containing sulfuric acid extract has a specific gravity of about 1.18, it contains about 30 percent isobutylene in 64 percent sulfuric acid. Within this range of specific gravities of the isobutylene-containing sulfuric acid extract, that is from about 1.15 to about 1.25, better yields of the desired high purity product are obtained and easier separation of the diisobutylene or triisobutylene-wash liquids from the isobutylene-containing sulfuric acid extract is obtained. When the specific gravity of the isobutylene-containing sulfuric acid extract is about 1.1, the sulfuric acid contains about 40 percent $C_4$ hydrocarbons and this concentration may cause processing difficulties and separation of the wash liquid polyisobutylene from the isobutylene-containing sulfuric acid extract is not as readily accomplished. When the specific gravity of the isobutylene-containing sulfuric acid extract is greater than about 1.25, the process is normally being opeated at undesirable efficiency since less $C_4$ hydrocarbon is dissolved in the acid, although the novel improvement of this invention is readily applied regardless of the concentration of the $C_4$ hydrocarbons in the sulfuric acid extract.

While the improvement in the defined scheme of isobutylene production is preferably employed with sulfuric acid of the strength recited as the isobutylene absorbent, and the isobutylene is separated or regenerated from the sulfuric acid extract by heating thin films of the isobutylene-containing sulfuric acid extract, it is applied equally well to schemes employing other polybasic, mineral, acid-acting substances which are selective solvents for isobutylene, and is readily incorporated in systems where isobutylene is separated from the sulfuric acid extract thereof by dilution and distillation and heating to obtain isobutylene.

Likewise, while it is advantageous to employ as the washing medium liquid isobutylene polymers such as diisobutylene and triisobutylene which are formed during the regeneration of isobutylene from the isobutylene-containing sulfuric acid extract, the improvement is as readily obtained with liquid polyisobutylenes such as diisobutylene and triisobutylene obtained from other sources. In those systems where excessive dilution of the isobutylene-containing sulfuric acid extract to recover isobutylene is practiced, little polyisobutylene is formed and the required amount for washing must be obtained from another source. A useful, inexpensive and continuous treating system is realized when diisobutylene and triisobutylene are separated from the heated sulfuric acid extract from which isobutylene has been regenerated and recycled to the washing area in this scheme. Liquid polypropylene, which is another unsaturated condensation product of an unsaturated olefin, propylene, of carbon content from 6 to 15, that is dipropylene, tripropylene, tetrapropylene (propylene tetramer) and the like; liquid polybutenes of carbon content from 8 to 16, and polypentylenes of 10 to 15 carbon atoms may also be employed in accordance with this invention as described herein for isobutylene polymers with the obtainment of similar excellent results. Such liquid polymers preferably employed are characterized as containing from 6 to 16 carbon atoms and at least one olefinic double bond. Such materials are readily obtained by heating propylene, butenes and/or pentylenes in the presence of concentrated sulfuric or phosphoric acids.

The washing operation, of course, may be carried out at any stage of the purification scheme outlined above after the $C_4$ hydrocarbons are mixed with the sulfuric acid and just prior to the time that the isobutylene is liberated or regenerated from the sulfuric acid. Liquid phase washing is preferred. The washing or extraction liquid, the liquid polyolefin, is easily separated from the acid extract and this may be performed by settling operations, or more preferably and rapidly by centrifuging and the like. After separation, the liquid polyolefin may be recycled and used again if desired. The washing operation may be carried out by counter-current contact of the sulfuric acid extract with the liquid polyisobutylene, in a mixer-settler system, in a series of contact and separating zones and the like.

The volume of liquid polyolefin employed may be varied in amount from about one-half volume to 10 volumes of isobutylene-containing sulfuric acid extract to 10 volumes or more of liquid polyolefin. Of course, it will be recognized by the man skilled in the art that no more than the required minimum amount of liquid polyolefin to treat the isobutylene-containing sulfuric acid extract to provide the desired final product purity will be employed. This normally will be an amount of polyisobutylene of from about one-half to two volumes, to 10 volumes of isobutylene-containing sulfuric acid extract. Larger amounts of the polyolefin may be required if large amounts of such impurities as the butenes are present in the acid.

During the normal course of the regeneration of isobutylene from the sulfuric acid extract by heating, some of the isobutylene is converted into polyisobutylene materials containing from 8 to 12 or more carbon atoms, including diisobutylenes and triisobutylenes essentially, with small amounts of other condensation products of higher carbon content such as $C_{16}$. When it is an object to provide pure isobutylene, the formation of polymer, of course, is preferably kept at a desired minimum. It is obviously an advantage of this invention that the polyisobutylene materials which are formed during the isobutylene regeneration as by-product isobutylene polymers, are readily and advantageously incorporated into the isobutylene purification process by feeding these materials back to a point immediately after the sulfuric acid absorption step and at a point just prior to regeneration of the pure isobutylene, to wash out of the isobutylene-containing sulfuric acid extract the undesirable $C_4$ hydrocarbon impurities dissolved or entrained therein. In the operation of the isobutylene reactors wherein the isobutylene-containing sulfuric acid extract is heated, as in a thin film, to liberate or regenerate the isobutylene, the amount of isobutylene polymer normally formed may be between about 25 and 75 percent of the isobutylene in the sulfuric acid extract depending on the concentration of sulfuric acid, isobutylene and temperature and time of heating. Of course, when isobutylene is the desired product, isobutylene polymer formation in the lower range, as less than about 40 percent, is preferred. Although it is an advantage of this invention that the isobutylene polymer formed in the isobutylene regeneration step is recycled back to extract undesirable $C_4$ hydrocarbons from the isobutylene-containing sulfuric acid extract, this system may be operated under conditions such that a minimum of isobutylene polymer is formed, as in systems where the isobutylene-containing sulfuric acid is diluted and the isobutylene is distilled out, or if for some economic or operational reasons it may be desired not to pass the isobutylene polymer back through the system. In such case, diisobutylene and/or triisobutylene from any source may be employed to treat the sulfuric acid extract as described hereinabove. When the isobutylene is regenerated from isobutylene-containing sulfuric acid extracts by heating, the amount of diisobutylene formed, in relation to triisobutylene formed, depends on operating conditions and is normally from about 2 to 3 times the amount of triisobutylene formed. These ratios are reversed when the isobutylene-containing sulfuric acid extract is aged prior to heating, heating at lower temperatures, for longer periods of time and the like as is known to those skilled in the art. Since either material is satisfactory in the process of this invention, effort to control this reaction is not essential.

*Example 1*

In a commercial embodiment of this invention 5 volumes of a $C_4$ hydrocarbon stream containing about 4 percent n-butane, 46 percent isobutane, 28 percent isobutylene, 18 percent butene-1, and 2 percent butene-2 was mixed with one volume of sulfuric acid of a concentration of 65 percent acid at a temperature of 100° F. to 110° F. and 80 to 100 p.s.i.g. The sulfuric acid extract containing about 20 percent isobutylene was weathered and then extracted with a 70/30 mixture of diisobutylene and triisobutylene at about 80° F. at a ratio of 2 total volumes of the diisobutylene and triisobutylene mixture to ten volumes of isobutylene-containing sulfuric acid extract. A two stage counter-current extraction system was employed in which the ten volumes of isobutylene-containing sulfuric acid extract was first mixed counter-currently with one volume of the isobutylene polymer mixture from the second stage extraction described below, the acid extract was separated from the isobutylene polymer by settling and mixed counter-currently with fresh polyisobutylene obtained from the isobutylene regeneration step in a second stage and separated therefrom again by settling. The wash polyisobutylene polymer thus separated from this second stage of the counter-current extraction system was then mixed with fresh isobutylene-containing sulfuric acid extract for the first stage counter-current extraction as described and after separations therefrom was passed to a storage or recovery system. The extracted isobutylene-containing sulfuric acid extract was then passed to isobutylene reactors or regenerators where the isobutylene is freed by heating the treated isobutylene-containing sulfuric acid in thin film at about 200° F. As described above, about 30 to 40 percent isobutylene polymer, diisobutylene and triisobutylene, are formed during this recovery step and after separation from the sulfuric acid by settling, was recycled to the second stage counter-current extractor. The isobutylene was then distilled in a tower to remove water and the resulting dry product had a purity greater than 99 percent. Fractional distillation normally is not required.

*Example 2*

A $C_4$ hydrocarbon stream containing 30 percent isobutylene was passed through sulfuric acid containing 63 weight percent sulfuric acid. The specific gravity of the isobutylene-containing sulfuric acid extract was 1.19 and the acid contained 28.3 percent $C_4$ hydrocarbons. Ten volumes of the isobutylene-containing sulfuric acid extract was washed twice with one volume each washing of distilled triisobutylene. After separation of the isobutylene-containing sulfuric acid extract from the triisobutylene, it was passed into a heated reaction zone in thin film to liberate the isobutylene at a temperature of 190° F. After drying, the isobutylene was found to contain by analysis, 99.86 percent isobutylene, 0.08 percent butene-1 and butene-2, and 0.06 weight percent saturated $C_4$ hydrocarbons.

*Example 3*

A $C_4$ hydrocarbon stream containing about 28 percent isobutylene was mixed with 62.8 weight percent sulfuric acid in amount to give an isobutylene-containing sulfuric acid extract having a specific gravity of 1.142. This isobutylene-containing sulfuric acid extract was washed twice with one volume each time of a liquid polyisobutylene polymer. This liquid polyisobutylene polymer contained about 70 percent diisobutylene and about 30 percent triisobutylene and was obtained as the by-product of heating an isobutylene-containing sulfuric acid extract of specific gravity of about 1.18 to about 200° F. to regenerate isobutylene, and during heating, the diisobutylene and triisobutylene were formed. The polyisobutylene mixture was separated from the sulfuric acid and used as such. After the treated isobutylene-containing sulfuric acid extract was separated from the polyisobutylene mixture, the sulfuric acid extract was heated to 195° F. to regenerate the isobutylene. The isobutylene was recovered, had a purity of 99.63 percent and contained 0.17 percent butene-1 and butene-2 and 0.14 percent saturated $C_4$ hydrocarbons.

*Example 4*

A $C_4$ hydrocarbon stream containing about 28 percent isobutylene was extracted with 63.2 weight percent sulfuric acid. The isobutylene-containing sulfuric acid extract had a specific gravity of 1.18 and contained 27.3 percent $C_4$ hydrocarbons dissolved therein. The isobutylene-containing sulfuric acid extract was extracted twice with distilled diisobutylene in a ratio of ten volumes of sulfuric acid extract to one volume of diisobutylene for each extraction. After separation of the isobutylene-containing sulfuric acid extract from the wash liquid, the isobutylene-containing sulfuric acid extract was passed to a heated reaction zone where the isobutylene was regenerated from the sulfuric acid extract by heating at a temperature of 196° F. The percent recovery of dry isobutylene was 54.9 and this dry product contained by analysis 99.7 percent isobutylene, 0.2 percent butene-1 and butene-2 and 0.1 percent saturated $C_4$ hydrocarbons.

When the above embodiment was repeated with the extraction step with diisobutylene omitted, the dry regenerated isobutylene had a purity of 95.06 percent and contained 4.43 percent butene-1 and butene-2 and 0.51 percent saturated $C_4$ hydrocarbons.

When the above examples are repeated with isopentylenes including 2-methylbutene-1, 2-methylbutene-2 and 3-methylbutene-1 similar excellent results are obtained.

*Example 5*

600 grams of a liquid mixture of hydrocarbons containing 35 percent $C_5$'s was mixed with 724 grams of 65.6 percent sulfuric acid. The mixture was allowed to settle and the two layers separated. 131 grams of $C_5$'s were absorbed in the sulfuric acid. The $C_5$-containing sulfuric acid extract was passed into a heated reaction zone over heated surfaces to provide thin film heating at a temperature of about 195° F. to regenerate the isopentylenes. The resulting liberated hydrocarbons, after drying, contained, by analysis, about 83 percent 2-methylbutene-2 and about 10 percent 2-methylbutene-1, about 3 percent isopentane, 0.5 percent n-pentane, about 0.6 percent pentene-1 and pentene-2 and about 2 percent unidentified $C_5$ hydrocarbons. The purity of the 2-methylbutenes so recovered was about 93 percent with the indicated impurities, of which isopentane and the pentenes are particularly undesirable. The procedure outlined above was repeated with the exception that the $C_5$-containing sulfuric acid extract was extracted with one volume of diisobutylene per 10 volumes of $C_5$-containing sulfuric acid extract by washing. The dried 2-methylbutene product obtained on regeneration had a purity of about 98.5 percent of which about 11.5 percent was 2-methylbutene-1 and with 87.1 percent 2-methylbutene-2. The impurities included 0.41 percent isopentane, 0.07 percent n-pentane, 0.04 percent pentene-1 and only immeasurable traces of pentene-2 and pentene-1.

We claim:

1. In a process for separating isoolefins from a $C_4$ hydrocarbon stream which comprises extracting the isoolefin from the $C_4$ hydrocarbon stream with sulfuric acid and regenerating isoolefin from the sulfuric acid extract, the improvement which comprises extracting the isoolefin-containing sulfuric acid extract, prior to regeneration of isoolefine, with an unsaturated liquid olefin polymer of from 8 to 16 atoms.

2. In a process for separation isobutylene from a hydrocarbon stream which comprises extracting the isobutylene from a hydrocarbon stream with sulfuric acid and regenerating isobutylene from the sulfuric acid extract, the improvement which comprises extracting the isobutylene-containing sulfuric acid extract, prior to regeneration of isobutylene, with an unsaturated liquid olefin polymer of from 8 to 16 carbon atoms.

3. In a process for separating isopentylenes from a hydrocarbon stream which comprises extracting the isopentylenes from the hydrocarbon stream with sulfuric acid and regenerating isopentylenes from the sulfuric acid extract, the improvement which comprises extracting the isopentylenes-containing sulfuric acid extract, prior to regeneration of isopentylenes, with an unsaturated liquid olefin polymer of from 8 to 16 carbon atoms.

4. In a process for segregating and purifying isobutylene comprising contacting a hydrocarbon mixture containing isobutylene with sulfuric acid of a concentration of about 50 to 70 weight percent acid and regenerating the isobutylene from the resulting isobutylene-containing sulfuric acid extract, the improvement which comprises washing the isobutylene-containing sulfuric acid extract, prior to regeneration of the isobutylene therefrom, with a liquid polyisobutylene containing 8 to 12 carbon atoms.

5. In a process for segregating and purifying isobutylene comprising contacting a hydrocarbon containing isobutylene with sulfuric acid of a concentration of about 60 to 65 weight percent acid and regenerating the isobutylene be heating the resulting isobutylene-containing sulfuric acid extract, the improvement which comprises extracting the isobutylene-containing sulfuric acid extract, prior to regeneration of the isobutylene therefrom, with a liquid polyisobutylene containing essentially diisobutylene and triisobutylene.

6. In a process for segregating and purifying isobutylene from admixture with $C_4$ hydrocarbons which comprises extracting the isobutylene from the $C_4$ hydrocarbon mixture with sulfuric acid and while liberating the isobutylene from the sulfuric acid extract by heat, a portion of the isobutylene in the sulfuric acid forms polyisobutylenes, the improvement which comprises separating the polyisobutylenes from the sulfuric acid and extracting the sulfuric acid extract containing isobutylene absorbed therein with the polyisobutylene prior to regeneration of isobutylene from the sulfuric acid extract.

7. In a process for segregating and purifying isobutylene from admixture with $C_4$ hydrocarbons which comprises extracting the isobutylene from a $C_4$ hydrocarbon mixture with sulfuric acid of a concentration of about 60 to 70 weight percent and at a temperature of about 60 to 125° F. and pressure of about 50 to 150 p.s.i.g., and while liberating the isobutylene from the sulfuric acid extract by heat, a portion of the isobutylene forms diisobutylene and triisobutylene, the improvement which comprises, in a continuous system, separating the diisobutylene and triisobutylene from the sulfuric acid and washing the sulfuric acid extract containing isobutylene absorbed therein with the diisobutylene and triisobutylene prior to regeneration of isobutylene from the sulfuric acid extract, in a ratio of at least about one-half volume of diisobutylene and triisobutylene to ten volumes of isobutylene-containing sulfuric acid extract.

8. In a process for segregating and purifying 2-methylbutenes comprising contacting a hydrocarbon containing 2-methylbutenes with sulfuric acid of a concentration of about 55 to 70 weight percent acid and regenerating the 2-methylbutenes by heating the resulting 2-methylbutenes-containing sulfuric acid extract, the improvement which comprises extracting the 2-methylbutenes-containing sulfuric acid extract, prior to regeneration of the 2-methylbutenes therefrom, with a liquid polyisobutylene containing essentially 8 to 12 carbon atoms.

References Cited in the file of this patent

UNITED STATES PATENTS

| | | |
|---|---|---|
| 2,497,191 | Steele et al. | Feb. 14, 1950 |
| 2,509,885 | Rupp et al. | May 30, 1950 |
| 2,560,362 | Morrell et al. | July 10, 1951 |